(12) United States Patent
Spittle et al.

(10) Patent No.: US 10,142,484 B2
(45) Date of Patent: Nov. 27, 2018

(54) NEARBY TALKER OBSCURING, DUPLICATE DIALOGUE AMELIORATION AND AUTOMATIC MUTING OF ACOUSTICALLY PROXIMATE PARTICIPANTS

(71) Applicant: Dolby Laboratories Licensing Corporation, San Francisco, CA (US)

(72) Inventors: Gary Spittle, Hillsborough, CA (US); Glenn Dickins, Como (AU); David Gunawan, Sydney (AU); Guilin Ma, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/549,581

(22) PCT Filed: Feb. 8, 2016

(86) PCT No.: PCT/US2016/016953
§ 371 (c)(1),
(2) Date: Aug. 8, 2017

(87) PCT Pub. No.: WO2016/130459
PCT Pub. Date: Aug. 18, 2016

(65) Prior Publication Data
US 2018/0048768 A1    Feb. 15, 2018

Related U.S. Application Data

(60) Provisional application No. 62/191,819, filed on Jul. 13, 2015, provisional application No. 62/113,611, filed on Feb. 9, 2015.

(30) Foreign Application Priority Data

Jun. 16, 2015   (WO) ................ PCT/CN2015/081548

(51) Int. Cl.
*H04M 3/56*       (2006.01)
*H04M 3/00*       (2006.01)
(Continued)

(52) U.S. Cl.
CPC .......... *H04M 3/568* (2013.01); *H04M 3/002* (2013.01); *H04M 3/34* (2013.01); *H04M 9/082* (2013.01);
(Continued)

(58) Field of Classification Search
CPC ........ H04M 3/568; H04M 3/34; H04M 3/002; H04M 2203/509
(Continued)

(56) References Cited

U.S. PATENT DOCUMENTS 7,613,291 B1   11/2009   Benyassine
7,835,774 B1   11/2010   Appell
(Continued)

FOREIGN PATENT DOCUMENTS

WO      02/28075       4/2002
WO      2013/166080    11/2013
WO      2013/184130    12/2013

OTHER PUBLICATIONS

Souden M. et al., "Optimal joint linear acoustic echo cancelation and blind source separation in the presence of loudspeaker nonlinearity", Multimedia and Expo, 2009. ICME 2009. IEEE International Conference on, pp. 117-120, Jun. 28-Jul. 3, 2009.
(Continued)

*Primary Examiner* — Thjuan K Addy

(57) ABSTRACT

In an audio conferencing environment, including multiple users participating by means of a series of associated audio input devices for the provision of audio input, and a series of audio output devices for the output of audio output streams to the multiple users, with the audio input and output (Continued)

devices being interconnected to a mixing control server for the control and mixing of the audio inputs from each audio input devices to present a series of audio streams to the audio output devices, a method of reducing the effects of cross talk pickup of at least a first audio conversation by multiple audio input devices, the method including the steps of: (a) monitoring the series of audio input devices for the presence of a duplicate audio conversation input from at least two input audio sources in an audio output stream; and (b) where a duplicate audio conversation input is detected, suppressing the presence of the duplicate audio conversation input in the audio output stream.

21 Claims, 13 Drawing Sheets

(51) Int. Cl.
    *H04M 3/34* (2006.01)
    *H04M 9/08* (2006.01)
    *H04R 27/00* (2006.01)
    *H04S 7/00* (2006.01)
    *H04R 1/10* (2006.01)

(52) U.S. Cl.
    CPC ............ *H04R 27/00* (2013.01); *H04S 7/302* (2013.01); *H04S 7/303* (2013.01); *H04M 3/569* (2013.01); *H04M 2203/509* (2013.01); *H04R 1/1083* (2013.01)

(58) Field of Classification Search
    USPC ............ 379/202.01, 392.01, 406.01, 201.01, 379/406.04
    See application file for complete search history.

(56) References Cited

U.S. PATENT DOCUMENTS

| | | | |
|---|---|---|---|
| 7,843,486 B1 | 11/2010 | Blair | |
| 7,920,158 B1 | 4/2011 | Beck | |
| 8,000,466 B2 | 8/2011 | Caspi | |
| 8,126,129 B1 | 2/2012 | McGuire | |
| 8,126,160 B2 | 2/2012 | Frauenthal | |
| 8,170,200 B1 | 5/2012 | Chu | |
| 8,199,927 B1 | 6/2012 | Raftery | |
| 8,320,577 B1 | 11/2012 | MacDonald | |
| 8,379,823 B2 | 2/2013 | Ratmanski | |
| 8,488,745 B2 | 7/2013 | Cutler | |
| 8,503,651 B2 | 8/2013 | Virolainen | |
| 8,582,794 B2 | 11/2013 | Foletta | |
| 8,743,743 B1 | 6/2014 | Mai | |
| 2005/0271194 A1 | 12/2005 | Woods | |
| 2010/0248704 A1 | 9/2010 | Pavel | |
| 2012/0184337 A1 | 7/2012 | Burnett | |
| 2012/0287769 A1 | 11/2012 | Saleem | |
| 2012/0290950 A1* | 11/2012 | Rapaport | H04L 51/32 715/753 |
| 2013/0129102 A1 | 5/2013 | Li | |
| 2013/0230184 A1 | 9/2013 | Kuech | |
| 2013/0282369 A1 | 10/2013 | Visser | |
| 2013/0301840 A1 | 11/2013 | Yemdji | |
| 2013/0316752 A1 | 11/2013 | Bodley | |
| 2014/0003635 A1 | 1/2014 | Mohammad | |
| 2014/0118472 A1 | 5/2014 | Liu | |
| 2014/0288927 A1 | 9/2014 | Klug | |
| 2014/0329511 A1 | 11/2014 | Vesa | |

OTHER PUBLICATIONS

Beritelli F. et al., "Performance evaluation and comparison of G.729/AMR?fuzzy voice activity detectors", Signal Processing Letters IEEE 9(3), 85-88, Mar. 2002.

Freund Y. et al., "A Decision-Theoretic Generalization of on-Line Learning and an Application to Boosting", Journal of computer and system sciences 55, pp. 119-139, Dec. 19, 1996.

Gilg V. et al., "Methodology for the Design of a Robust Voice Activity Detector for Speech Enhancement", International Workshop on Acoustic Echo and Noise Control Kyoto Japan IEEE, pp. 131-134, Sep. 2003.

Ramirez J. et al., "Voice Activity Detection Fundamentals and Speech Recognition System Robustness", Robust Speech Recognition and Understanding InTech, pp. 1-22, Jun. 2007.

Ravichandran T. et al., "Performance Evaluation and Comparison of Voice Activity Detection Algorithms", International Journal of Soft Computing 2(2), 257-261, 2007.

Scholkopf B. et al., Learning with Kernels: Support Vector Machines, Regularization, Optimization and Beyond, Cambridge MA MIT Press, pp. 1-644, 2002.

Davis, A. "A Study of Voice Activity Detectors" Electrical and Computer Engineering, Perth, Curtin University of Technology, 2008.

Kularatna, N. et al Essentials of Modern Telecommunications Systems, Artech House, 2004.

Gatica-Perez D. et al., "Audiovisual Probabilistic Tracking of Multiple Speakers in Meetings", IEEE Transactions on Audio, Speech and Language Processing, vol. 15, No. 2, pp. 601-616, Feb. 2007.

* cited by examiner

NEARBY TALKER OBSCURING, DUPLICATE DIALOGUE AMELIORATION AND AUTOMATIC MUTING OF ACOUSTICALLY PROXIMATE PARTICIPANTS

CROSS-REFERENCE TO RELATED APPLICATIONS

This application claims priority to U.S. Provisional Patent Application No. 62/113,611 filed 9 Feb. 2015; PCT International Application No. PCT/CN2015/081548 filed 16 Jun. 2015; U.S. Provisional Patent Application No. 62/191,819 filed Jul. 13, 2015, which are hereby incorporated by reference in its entirety.

TECHNOLOGY

The present invention relates to the field of audio processing systems and, in particular, discloses a system for monitoring the audibility of duplicated audio in a conferencing system due to conversations between closely spaced audio recipients.

BACKGROUND

Any discussion of the background art throughout the specification should in no way be considered as an admission that such art is widely known or forms part of common general knowledge in the field.

Recently, the utilisation of audio conferencing systems has become increasingly popular. These audio conferencing systems are adapted to provide multi-party audio conferences where many participants participate in an audio conference through interaction with an audio conferencing server.

Increasingly, such systems have been utilised in conjunction with an Internet VOIP type environment to provide for complex distributed audio conferencing facilities.

With any such audio conferencing system, a number of assumptions normally exist including having a series of listeners or participants at geographical dispersed locations with each listener participant having audio input facilities such as microphones or the like in addition to audio output facilities such as speakers, headphones or the like for listening to other participants. The audio input and output devices are normally interconnected by means of an electronic audio signalling path, and often, although not restricted to, a central server. The central server is responsible for managing the incoming audio from each of the endpoints and then creating a suitable mix or combination of audio streams to return to each endpoint that generally will include all or most relevant other incoming audio other than that generated from the particular endpoint for which the mix is created. An alternate to a server may be a system of distributed or allocated hosting of the logic and mixing, in order to achieve the same outcome of a suitable audio mix to be sent to each client.

A general assumption of such systems is that each endpoint is acoustically isolated, and therefore there is no sense that any endpoint can hear or be heard by another endpoint by local acoustic path. This is typically satisfied in conference systems where users join the meeting from different geographic locations or even from separate rooms within the same office environment.

Unfortunately, such systems are prone to a number of problems when the assumption of participants being acoustically isolated is not met such as when different participants join the conference from proximal cubicles in an open plan office. In these circumstances, there is a propensity for audio coupling between two or more endpoints of either the local activity and/or output audio of the conferencing system. This can lead to various problems including the proximal participants being presented with or hearing multiple streams of the same or similar audio with different delays or latency. It is very difficult for a user to understand speech that consists of the direct, or intended, stream and one or more delayed copies of the same signal that overlap in time with the original. Very short delays where the additional signals are significantly lower level than the original can be tolerated, such as is the case for reverberant signals. However, a particular problem arises when multiple participants each with their own microphone and speaker facilities are in close proximity to one another. For example, in such an arrangement, a first participant is likely to be able to receive the direct acoustic emission from a closely spaced second conference participant directly, in addition to receiving the same audio, but delayed, via the audio server. In such conferencing systems, the delay between the direct and mediated audio is typically of the order of 100 ms to 500 ms, which is particularly problematic and distracting to the user.

Four possible paths of secondary or duplicate audio that may cause problems are illustrated in FIG. 1 and described below:

Path 1 From the mouth of User A to the ears of User B
Path 2 From the mouth of User A to the microphone of User B
Path 3 From the speaker of User A to the ears of User B
Path 4 From the speaker of User A to the microphone of User B.

All of the above paths can also be present in the return from User B to User A.

Such arrangements often lead to an unnatural and disconcerting conference experience where the participants find it difficult to communicate efficiently.

SUMMARY OF THE INVENTION

In accordance with a first aspect of the present invention, there is provided in an audio conferencing environment, including multiple users participating by means of a series of associated audio input devices for the provision of audio input, and a series of audio output devices for the output of audio output streams to the multiple users, with the audio input and output devices being interconnected to a mixing control server for the control and mixing of the audio inputs from each audio input devices to present a series of audio streams to the audio output devices, a method of reducing the effects of cross talk pickup of at least a first audio conversation by multiple audio input devices, the method including the steps of: (a) monitoring the series of audio input devices for the presence of a duplicate audio conversation input from at least two input audio sources in an audio output stream; and (b) where a duplicate audio conversation input is detected, determining whether to suppress the presence of the duplicate audio conversation input in the audio output stream.

The method optionally includes the step of (c) suppressing the presence of the duplicate audio conversation input in the audio output stream.

The duplicate audio conversation can occur in the acoustic environment or in one of the audio output streams.

The duplicate audio conversation may be a duplicate of an acoustic signal originating from an input device of a user proximal to another user. The duplicate audio conversation may also be a duplicate of an acoustic signal originating from an output device of a user at a location proximal to another user.

In some embodiments, the associated audio input devices can include audio input devices placed adjacent to at least one of the users' ear to simulate the likely input to the user's ear. The associated audio input devices can include an active noise cancelling set of headphones including an internal ear microphone. The active noise cancelling set of headphones can include an internal ear microphone, a microphone external to the headphones and a voice microphone.

In some embodiments, the audio from a current user's input audio stream can be analysed to determine if a voice can be present, and when the voice can be present, the audio output stream can be analysed to determine if a corresponding conversation can be present, and if present, a notification of presence can be flagged. The notification can be flagged to a graphical user interface presented to a user for muting a conversation.

In some embodiments, the step (a) further preferably can include utilising a delay buffer for comparing a current audio input stream to determine if any of the audio output streams can include the same audio content as the audio input stream and step (c) includes suppressing the echo if the audio output streams are determined to include the same audio content as the audio input stream.

In some embodiments the graphical user interface allows users to provide feedback to indicate the presence of a duplicate audio conversation. In one embodiment the feedback includes an indication of the user from which the duplicate audio conversation originates. In one embodiment the feedback includes an indication of whether the duplicate audio conversation is heard acoustically or through the user's output device.

In one embodiment the monitoring step (a) includes:
(a)(i) distinguishing background audio indicative of one or more background users from nearfield audio of a nearfield user.

The background audio is preferably distinguished from the nearfield audio by determining a correlation of voice activity based on predetermined information. The predetermined information preferably includes information about a type of input device and/or a type of output device used by a user. Determining a correlation of voice activity preferably includes applying a voice activity detection algorithm using predefined classification rules.

In one embodiment step (b) includes:
(b)(i) associating the detected duplicate audio conversation with one or more users or users' hardware.

In one embodiment step (b)(i) includes correlating an audio input received from each of the users' input devices with the duplicate audio conversation. More preferably, step (b)(i) includes:
determining a voice activity measure of the duplicate audio conversation;
determining a voice activity measure of each user;
correlating the voice activity measure of the duplicate audio conversation with the voice activity measures of each user; and
selecting the user with the highest correlation.

In one embodiment the step of correlating the voice activity measures includes deriving a conversational probability indicative of the likelihood that the duplicate audio conversation matches an audio signal captured by a particular user's output device.

In one embodiment step (b)(i) includes performing voice recognition on the duplicate audio conversation and comparing this with stored voice information for users of the audio conference. In one embodiment step (b)(i) includes determining the physical location of the users. In one embodiment step (b)(i) includes determining the IP or MAC addresses of local computers used by the users.

In one embodiment step (b) includes:
(b)(ii) determining a likelihood of whether the a user is able to directly hear an acoustic version of the duplicate audio conversation from another user's mouth or another user's output device.

In one embodiment the likelihood is dependent upon the output hardware used by a user. In one embodiment the likelihood is dependent upon an amplitude of the background audio relative to the amplitude of the nearfield audio. In one embodiment the likelihood is based on a determination of whether the amplitude of the background audio is greater than a predetermined threshold of audibility.

In one embodiment step (b) includes:
(b)(iii) measuring the intelligibility of the speech in the duplicate audio conversation.

In one embodiment step (c) includes selectively muting the duplicate audio conversation at one or more of the user's output devices. In one embodiment step (c) includes selectively deactivating the input device of a user for a predetermined time period. In one embodiment step (c) includes instructing the server not to mix the audio input from an audio input device for a predetermined time period.

In accordance with a second aspect of the present invention, there is provided an audio conferencing system for conducting a multi user audio conferencing, including: a series of audio input devices for capturing audio input streams of conference users; a series of audio output devices for outputting corresponding mixed audio output streams for the conference users; a mixing server interconnected to the audio input streams, and for each audio output stream, mixing predetermined ones of the audio input streams together to produce a corresponding audio output stream of other conference users, for forwarding for output to a corresponding audio output device; at least one monitoring unit for monitoring if more than one audio input stream has picked up a duplicate audio conversation of a conference user, and where such a duplicate conversation has been picked up, determining whether to suppress the duplicate audio conversation for at least one of the audio output streams.

The monitoring unit preferably can include a delay buffer for maintaining a delayed buffer copy of a current input audio stream and monitoring the audio output stream for copies of the audio input stream. The monitoring unit further preferably can include a suppression unit for suppressing detected copies of the audio input stream that are present in the audio output stream.

Preferably, an audio input device, a monitoring unit and an audio output device are collocated as a local client computational resource, and said mixing server is separately located as a server computational resource, interconnected to said local computational resource.

In accordance with a third aspect of the present invention, there is provided a method of reducing the effects of cross talk pickup of a single audio conversation by a series of microphones in a multiparty audio conferencing system, the method including the steps of:

(a) monitoring a series of audio conversations for repeats or for multiple microphone pickups;
(b) where a repeat is detected, removing at least one of the repeats out of the audio conversation for playback to a listener.

In accordance with a fourth aspect of the present invention, there is provided, in an audio conferencing environment, including multiple users participating by means of a series of associated audio input devices for the provision of audio input, and a series of audio output devices for the output of audio output streams to the multiple users, with the audio input and output devices being interconnected to a mixing control server for the control and mixing of the audio inputs from each audio input devices to present a series of audio streams to the audio output devices, a method of reducing the effects of cross talk pickup of at least a first audio conversation by multiple audio input devices, the method including the steps of:
  (a) monitoring the series of audio input devices for the presence of a duplicate audio conversation input from at least two input audio sources in an audio output stream; and
  (b) where a duplicate audio conversation input is detected, suppressing the presence of the duplicate audio conversation being input to the conference server by means of selectively suppressing the captured microphone signal prior to sending to the server.

In accordance with a fifth aspect of the present invention, there is provided, in an audio conferencing environment, including multiple users participating by means of a series of associated user terminals each having an associated audio input device for the provision of audio input, and an associated audio output device for the output of audio output streams to the multiple users, with the audio input and output devices being interconnected to a mixing control server for the control and mixing of the audio inputs from each audio input device to present a series of audio streams to the audio output devices, a method of reducing the effects of cross talk pickup of at least a first audio conversation by multiple audio input devices, the method including the steps of:
  detecting the presence of one or more undesired audio signals at a first user terminal;
  performing an assessment as to whether or not to suppress the undesired audio signal;
  based on the assessment, selectively suppressing the undesired audio signal to reduce crosstalk heard by the user at the first participant terminal.

In one embodiment the undesired audio signals include an acoustic signal originating from an input device of a user proximal to another user. In one embodiment the undesired audio signals include an acoustic signal originating from an output device of a user proximal to another user.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

The preferred embodiment operates in an environment for audio teleconferencing (with or without an associated video stream).

Figure 1:
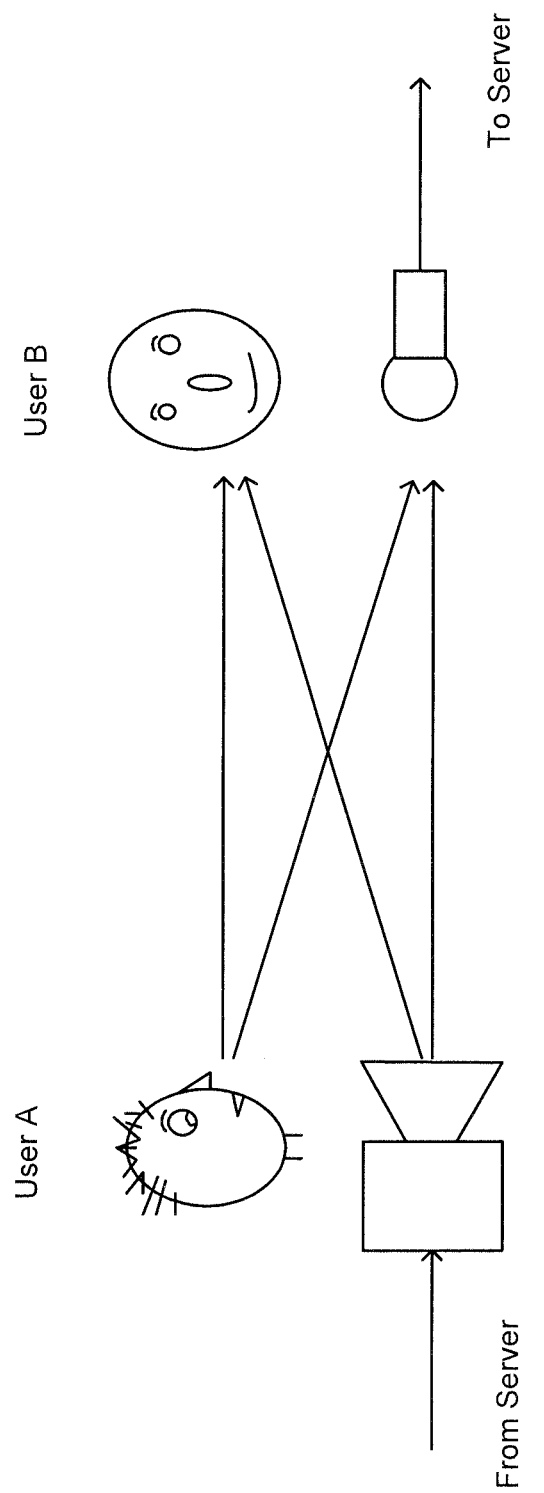
FIG. 1 illustrates schematically four example audio coupling paths arising in a scenario where two audio conference participants are located acoustically proximate to each other.
Figure 2:
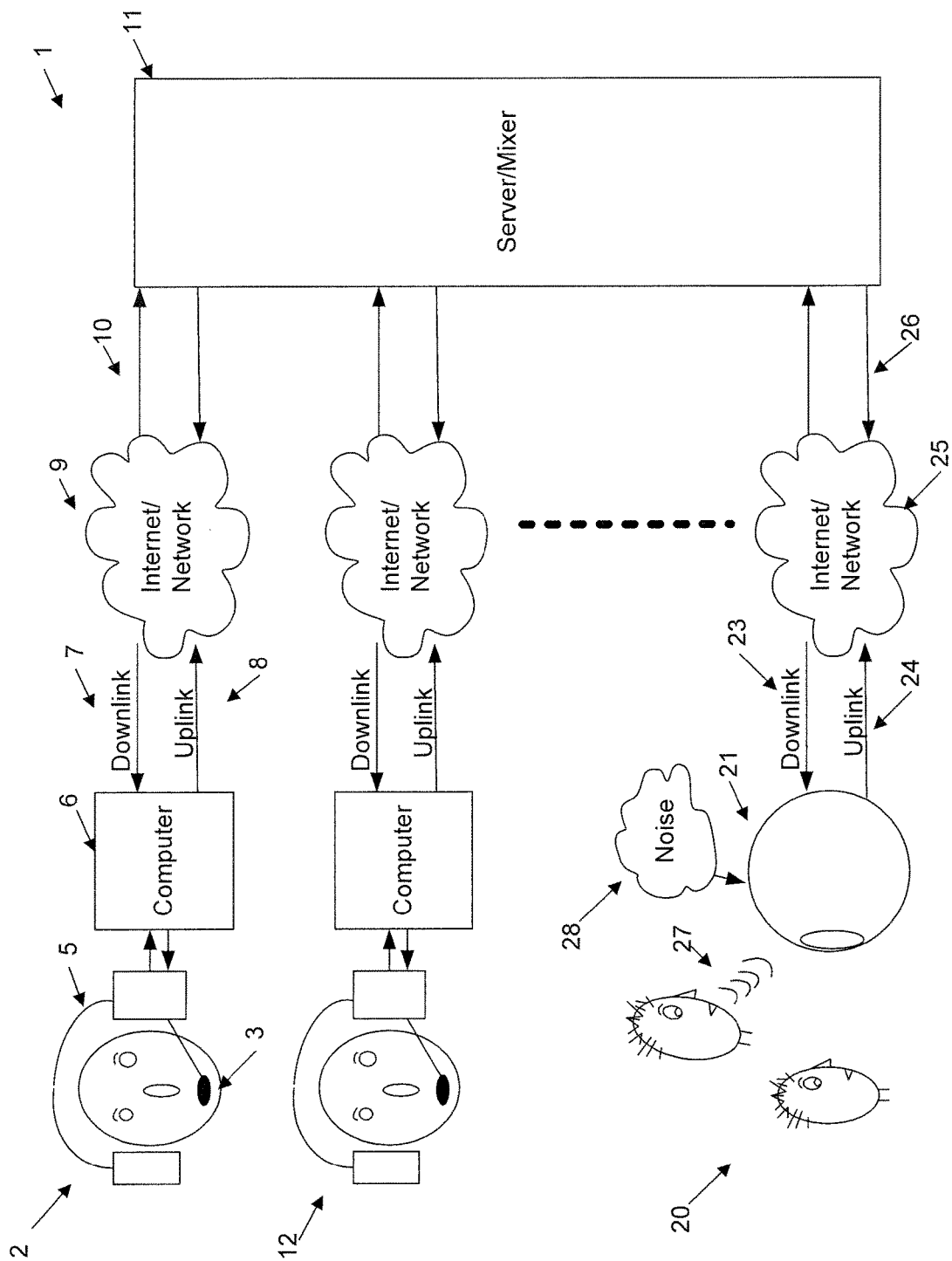
FIG. 2 illustrates schematically an example audio conferencing environment.

An exemplary audio teleconferencing system 1 is illustrated in FIG. 2. In this arrangement a series of conference participants collectively provide audio input through respective microphones and receive output through respective speakers or headphones. For example, in the arrangement 1, a first participant 2 uses a pair of headphones 5 and input microphone 3 interconnected to computer 6 for conference participation. The computer 6 provides uplink 8 and downlink 7 connections over a network 9, with a server or mixer 11. Thus, the computer 6 represents a local sending/receiving client for the audio conference.

A second participant 12 operates a similar arrangement to the participant 2.

A second group of participants e.g. 20 use an audio device 21 which provides audio output including spatialization information. The audio device 21 also provides internal computational and communication abilities and includes uplink 23 and downlink 24 channels which interconnect via network 25, 26 with mixer 11. Additional participants can also be interconnected to the mixer via other means.

The arrangement of FIG. 2 includes a plurality of conference participants 2 utilising discontinuous transmission (DTX) endpoints, exemplified by the binaural headset 5 with boom microphone 3. Each of said plurality of DTX endpoints asserts 10 a DTX uplink stream 8 to the teleconferencing mixer 11, typically via a network 9. The server/mixer produces a downlink stream 7 for each DTX endpoint, which is transmitted back to the endpoint 2, over the network 9, to be heard by the participant 2.

In the teleconferencing system, each of the participant endpoints sends an uplink audio stream to a teleconferencing mixer and receives a downlink stream therefrom. In such a system, the uplinks and downlinks may be encoded digitally and transmitted via a suitable packet-switched network, such as a voice over internet protocol (VoIP) network, or they may travel over a circuit-switched network, such as the public switched telephone network (PSTN). Either way, it is the mixer's 11 responsibility to produce a downlink audio stream to send back to each endpoint such that, in general, each participant hears every other participant except himself.

However, a problem can ensue when the users are placed spatially or geographically close to one another. In this case, for example, it is assumed that each of the users 2, 12 and 20 are able to acoustically hear one another in addition to receiving audio feedback via their audio output devices of the same speech, with a somewhat delayed emission. Further, the speech of one user is liable to be picked up by other user's microphones, thereby providing delayed feedback situations which are highly disconcerting to all other participants of the conference. In the case where there is more than one user acoustically proximate, the simultaneous pickup of a local activity on multiple user's microphones will create multiple copies of similar audio arriving at the server. Generally, with similar latencies and different levels, this proximate repetition of audio is not too problematic perceptually, usually creating a false spatial impression. However, such traffic is undesirable for system performance and capability. In other cases where one proximate user's microphone picks up the output audio from a conference, then this creates very undesirable delayed audio echo to many participants, and can in-fact create an unstable feedback known as 'howling'. Therefore the preferred embodiments of this invention are also suitable for preventing this scenario.

A number of difficult interactions arise when users are closely located to one another, especially when a user hears an audio stream through an unintended acoustic path. For example, a number of scenarios can ensure.

Figure 3:
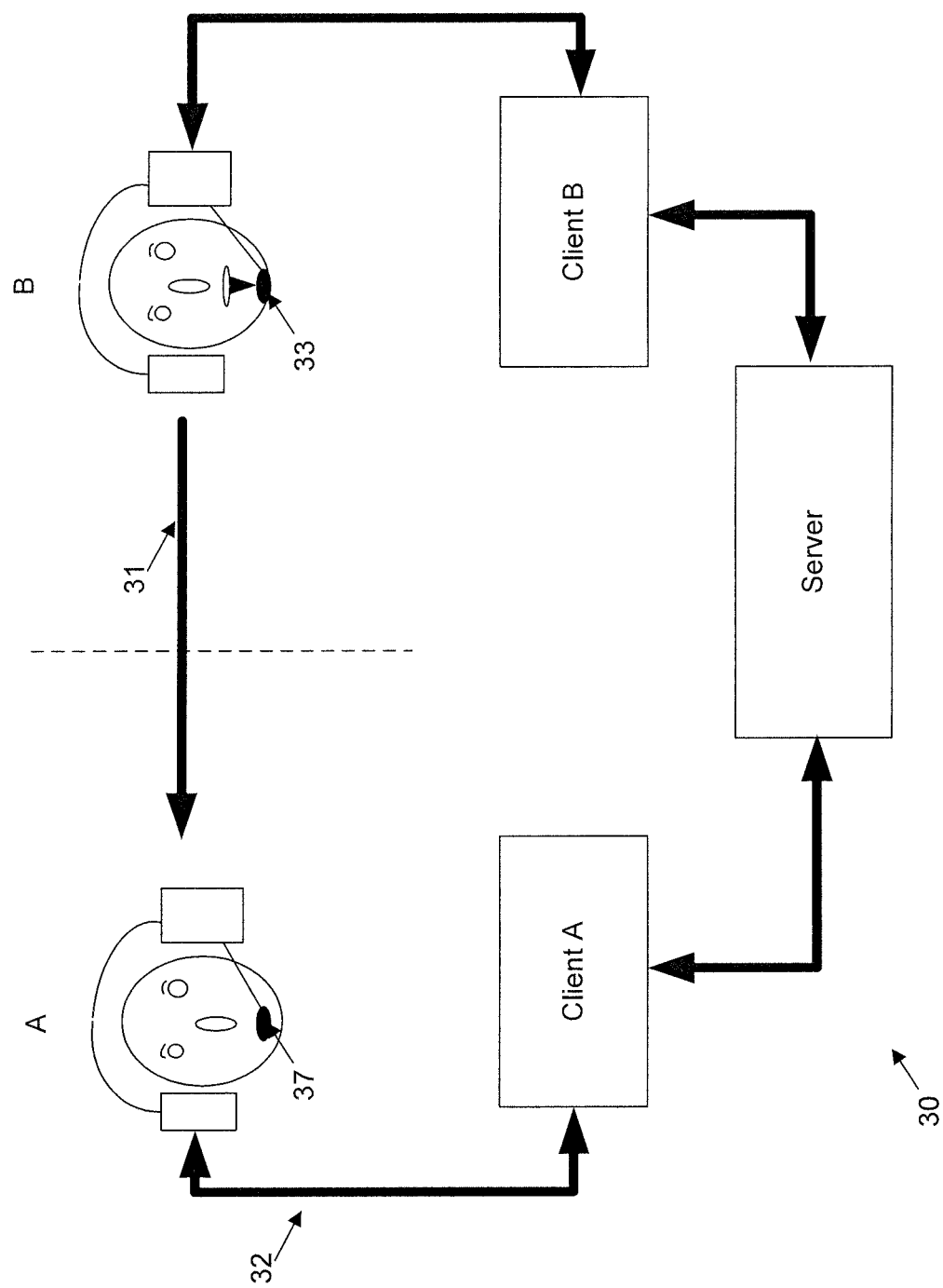
FIG. 3 illustrates schematically a first example nuisance talking environment.

Scenario 1: Turning now to FIG. 3, a first scenario is illustrated. User A is on a call with user B. User B is located such that their voice is heard by user A via two paths, a direct acoustic path 31 and a conference audio stream path 32 via microphone 33. Further, User B's voice can be picked up by the microphone 37 at User A and is sent back to User B as an echo. The voice paths will have different latencies (typically, the path 31 is significantly less latency than the path 32). This scenario can occur when the two users are collocated in an open plan office with very little acoustic isolation between them. For example, when User B is talking, User A will hear the direct acoustic path, then a little later, User A hears User B's voice through the conferencing system into his headset. The headset provides very little acoustic isolation. This is very disturbing for User A.

Figure 4:
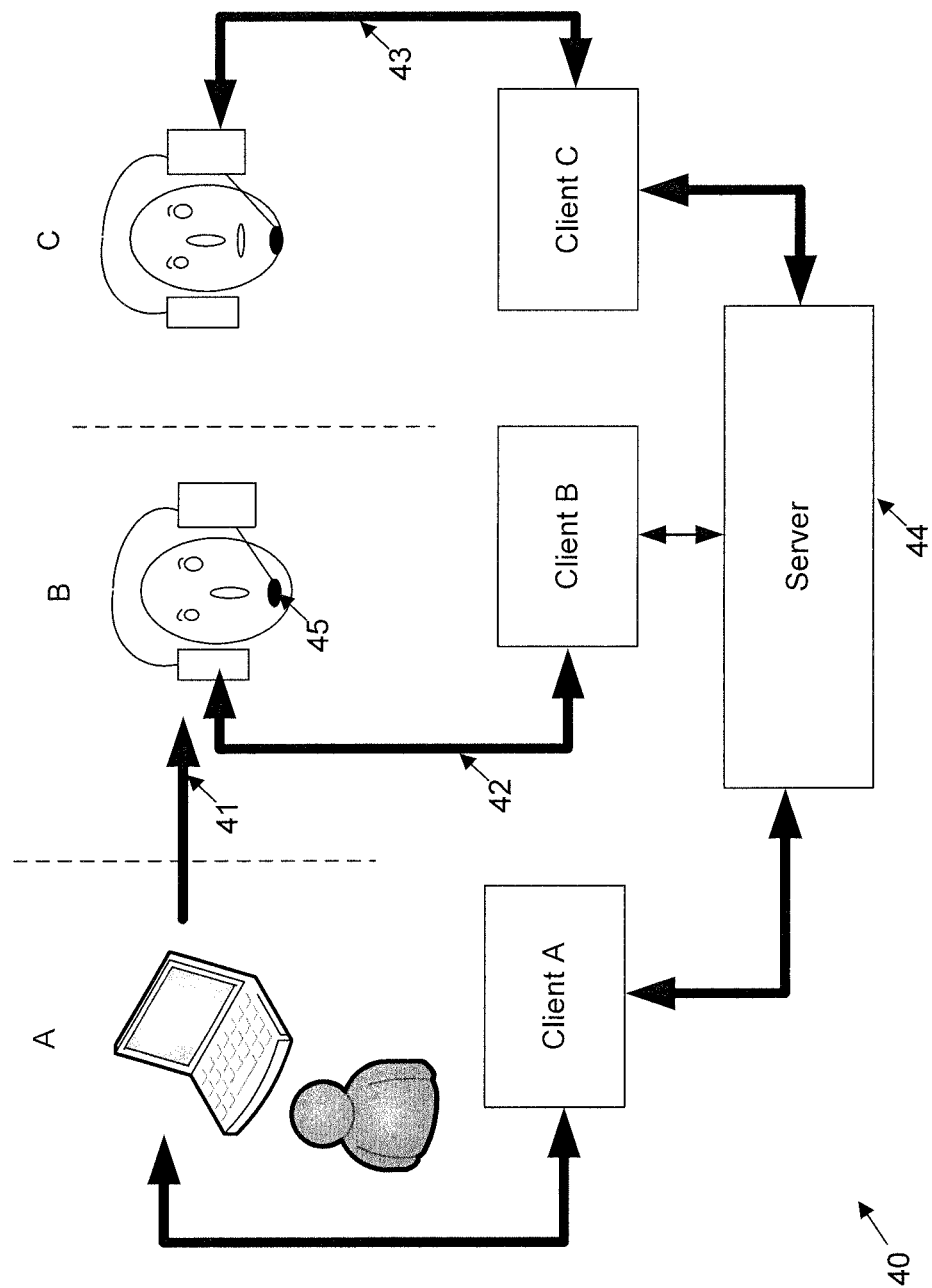
FIG. 4 illustrates schematically a second example nuisance talking environment.

Scenario 2: A further second scenario is illustrated 40 in FIG. 4. In this scenario, User A is on a call with user B and user C. User B is located such that he hears the voice of user C via two paths. An acoustic path 41 from the output of the conference for user A who utilises computer loudspeakers, and a conference audio stream 42, 43, via server 44. User C can also potentially hear an echo of their own voice if the microphone 45 of User B picks up the acoustic signal from User A.

This scenario can occur in an open plan office where a small team of people are gathered around a conference speaker or a laptop. For example, a group may be sharing a laptop to listen to the conference call (user A). They are using the speakers on the laptop or USB loudspeaker plugged into the laptop. User B is located less than 3 m from the team and is using his personal laptop and a headset. User B is presenting slides and talking into his headset. When a remote talker, such as User C, is responding to User B's question, User B hears User C in his headset and also from the loudspeaker in the neighbouring marketing area. This is disturbing for User B. User B needs to mute User C for his local mix and only use the audio from the marketing loudspeaker.

Figure 5:
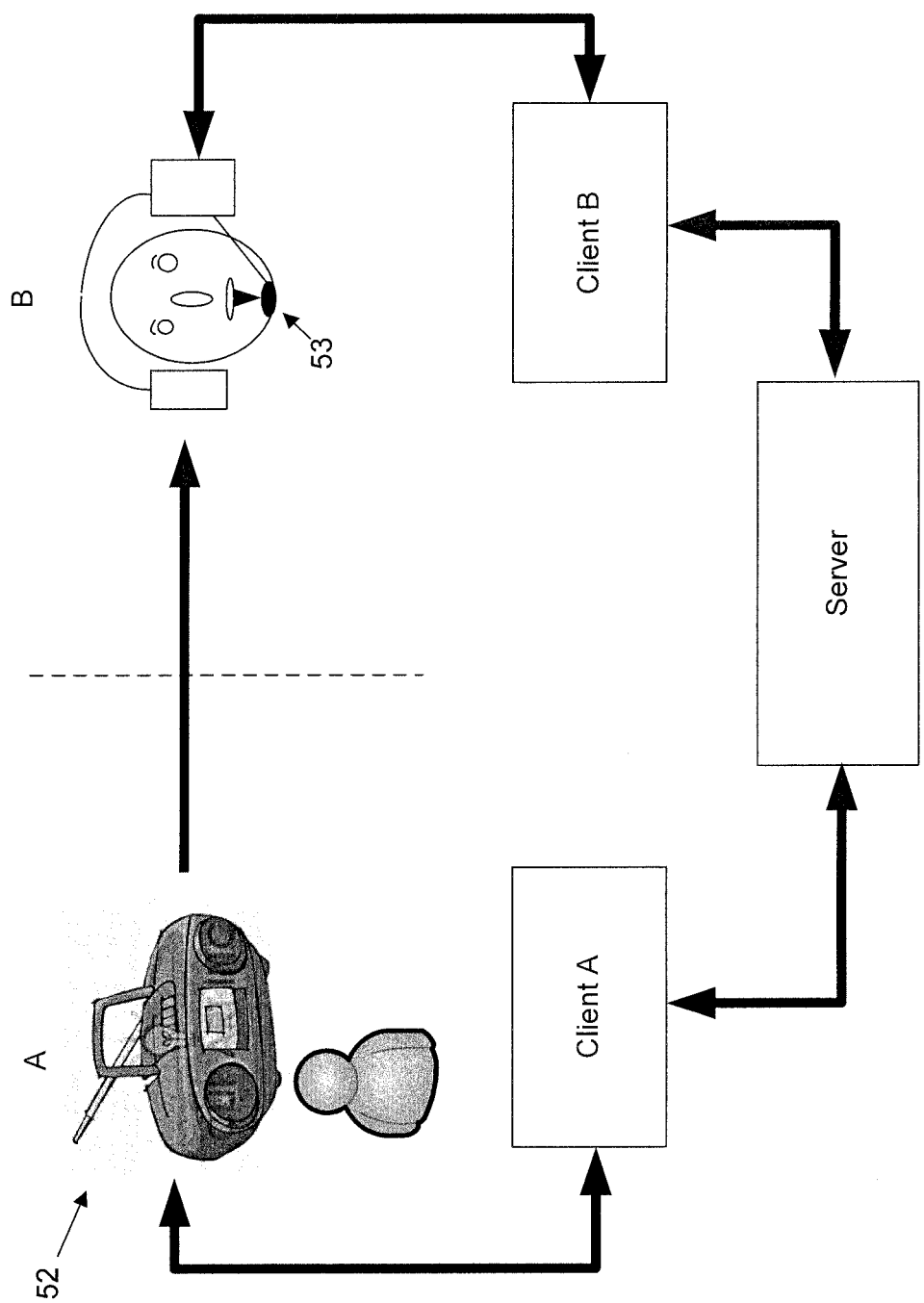
FIG. 5 illustrates schematically a third example nuisance talking environment.

Scenario 3: A third scenario is illustrated in FIG. 5. Here User A is on a call with user B. User B is located such that they hear their own voice as an echo 51 from the output of the conference for user A. User A has a loudspeaker system, e.g. a docking station 52. User A is using the microphone and speakers on their laptop. There is now potentially an echo path causing howling as the microphone 53 of user B picks up the acoustic path from user A.

Figure 6:
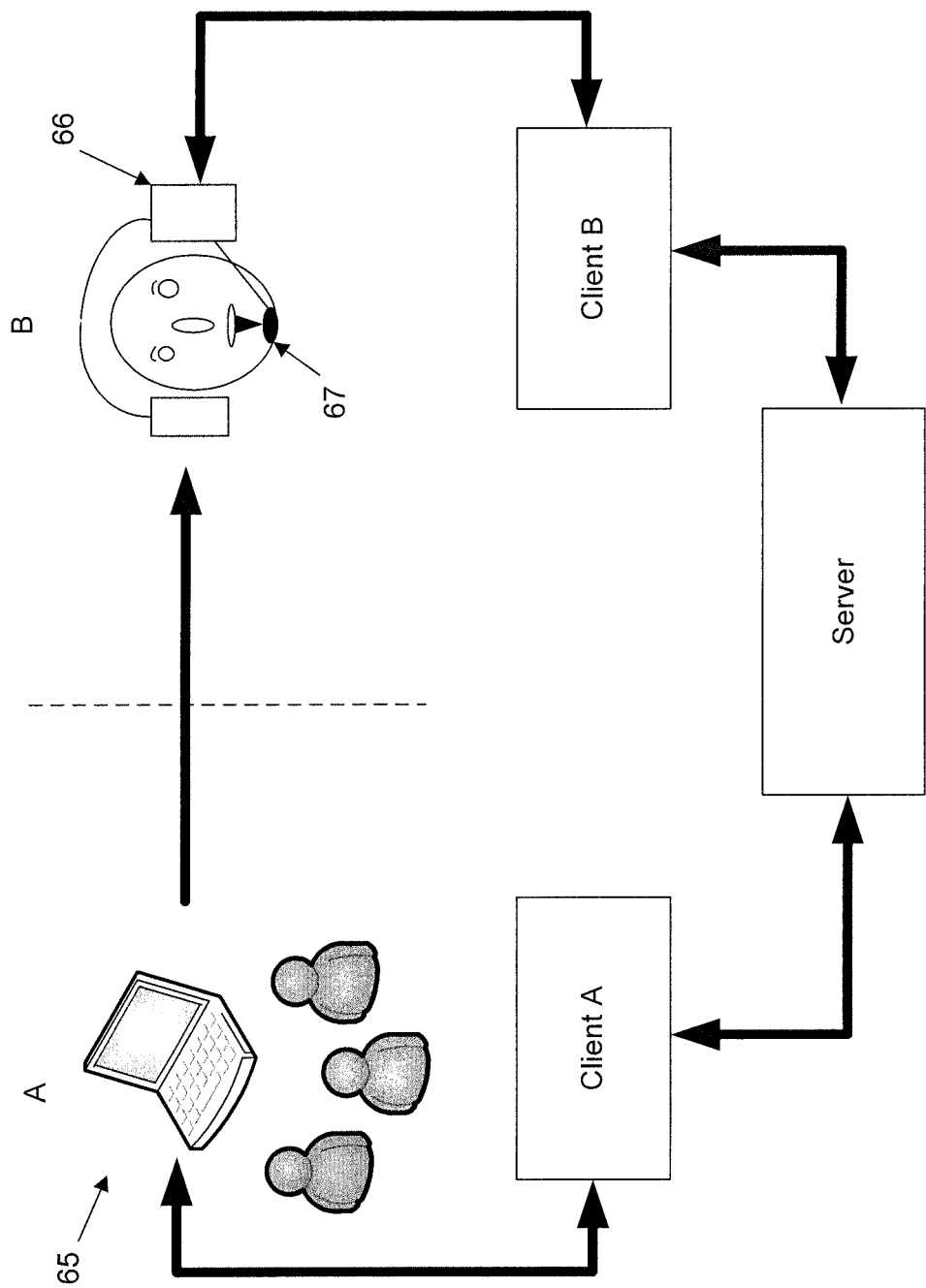
FIG. 6 illustrates schematically a fourth example nuisance talking environment.

Scenario 4: FIG. 6 illustrates a further scenario. This scenario occurs in an open plan office where a small team of people are gathered around a conference speaker or a laptop. For example, a first team are sharing a laptop 65 to listen to a conference call. They are using the speakers on the laptop or USB loudspeaker plugged into the laptop. User B is located close by from the marketing team and is using his personal laptop and a headset. User B is presenting slides and talking into his headset. When User B is talking into his headset he hears his own voice as a sidetone path in the headset. He also hears the acoustic path of his own voice as an echo, delayed, through the loudspeaker from laptop 66. This is disturbing for User B and he finds it very difficult to maintain continuous speech. User B would like to mute the loudspeaker and have the team listen to his direct acoustic path. The extension to this is that User B's microphone 67 now picks up his own delayed voice from the marketing loudspeaker. This feedback path can cause howling into the conference. The echo path is also disturbing for all the other remote listeners on the call.

Procedure Overview

In the embodiments of the invention, various methods and systems are adopted to reduce the incidence of nuisance audio from background talkers on the audio conversation. A procedure 100 for reducing crosstalk in an audio conference environment is outlined in FIG. 7. Procedure 100 is preferably performed by the central audio server/mixer but may be performed partially or wholly on a per-user basis by different local client computers.

Figure 8:
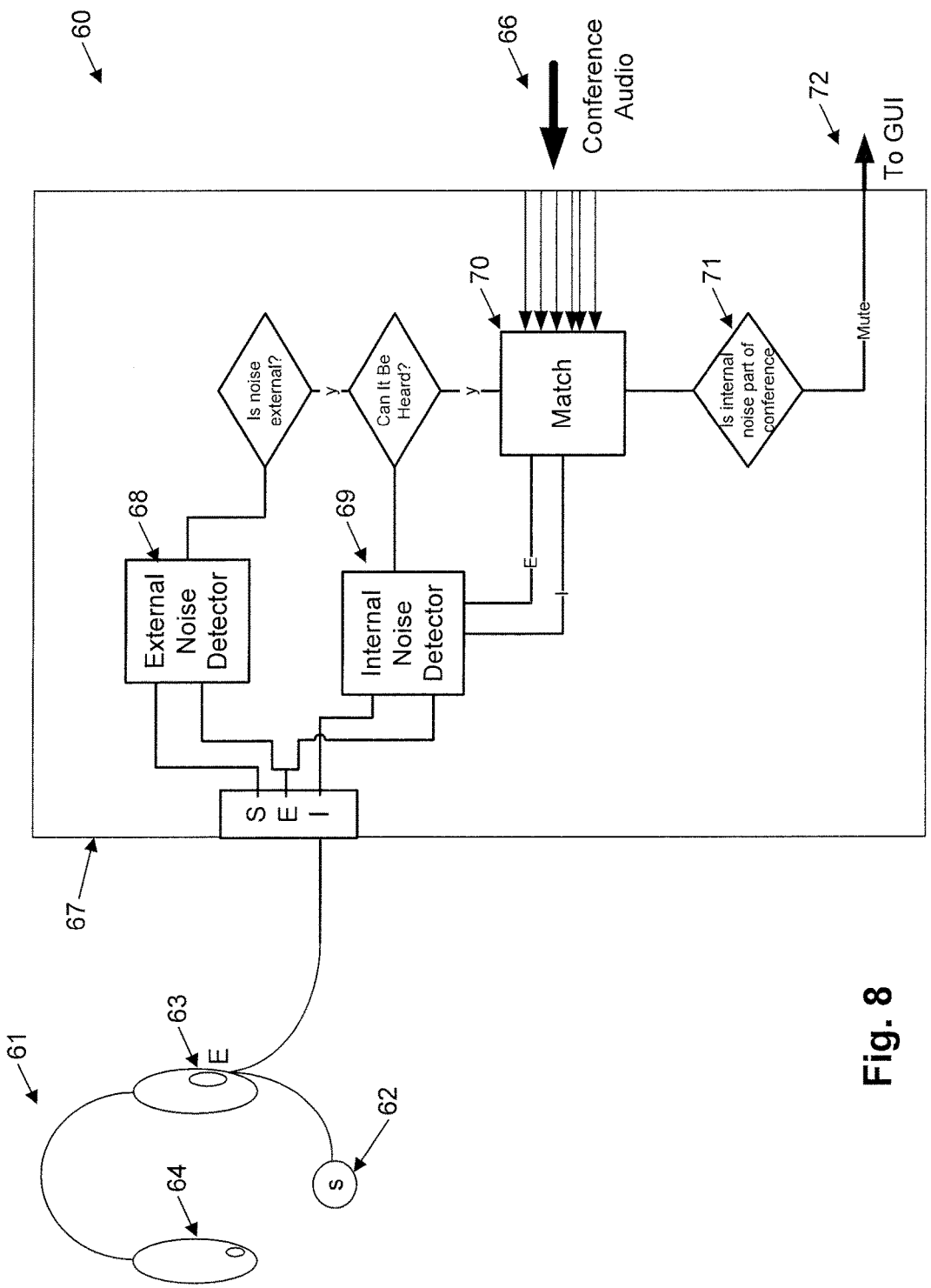
FIG. 8 illustrates schematically a first nuisance audio suppression environment.
Figure 9:
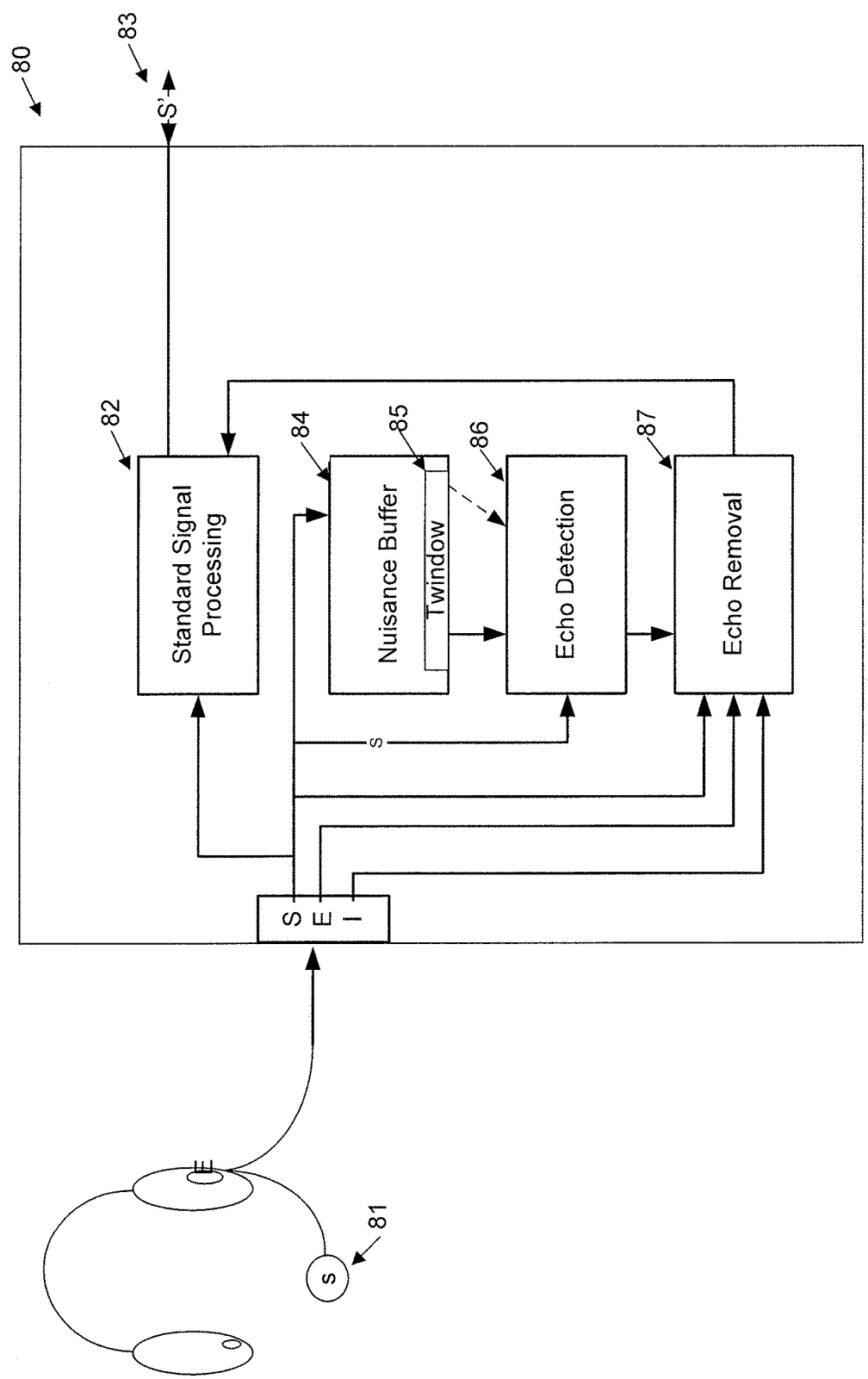
FIG. 9 illustrates schematically a second example nuisance audio suppression environment.
Figure 10:
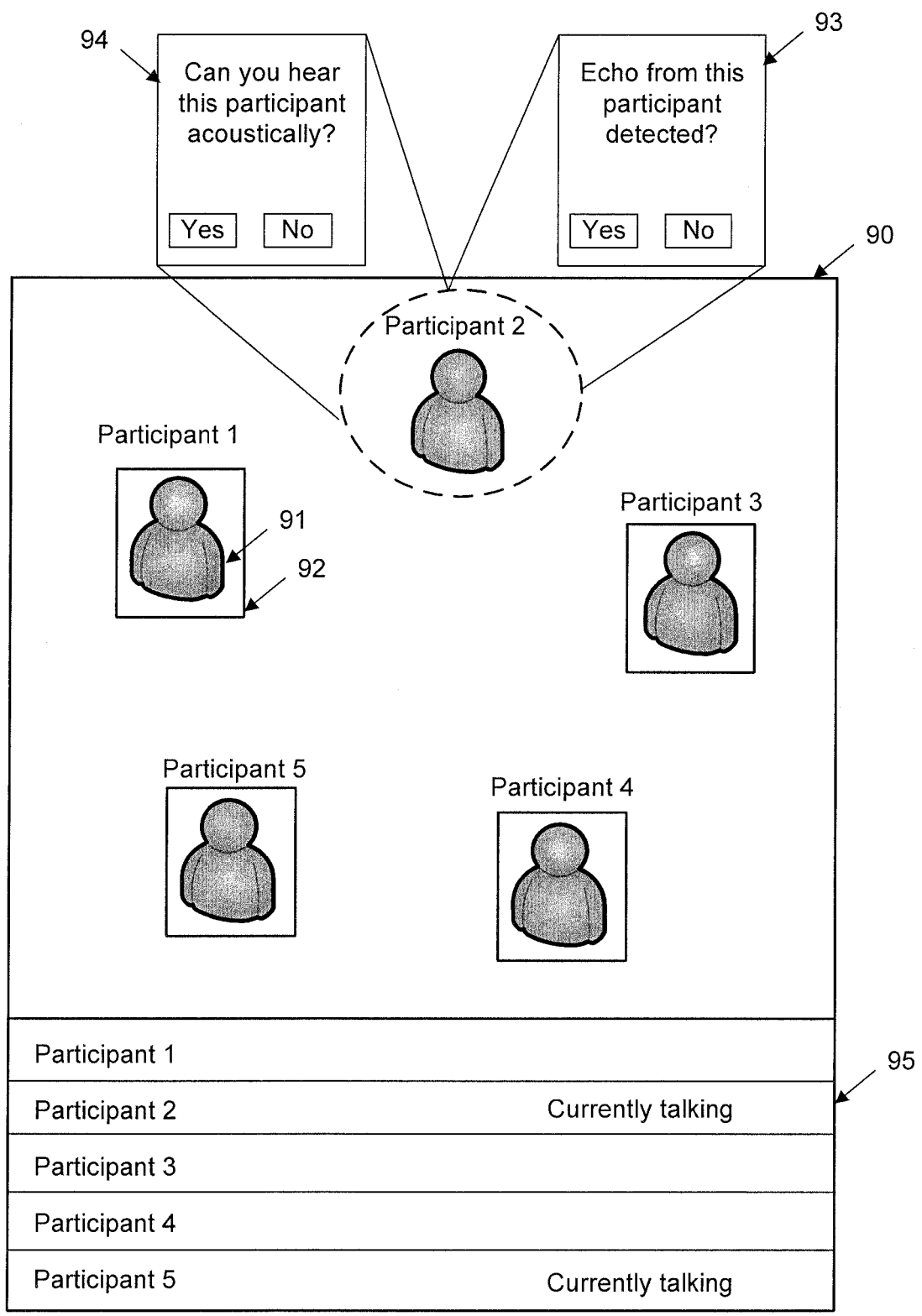
FIG. 10 illustrates a graphical user interface identifying users in an audio conference and allowing a user to indicate that they can hear nuisance audio of another participant.
Figure 11:
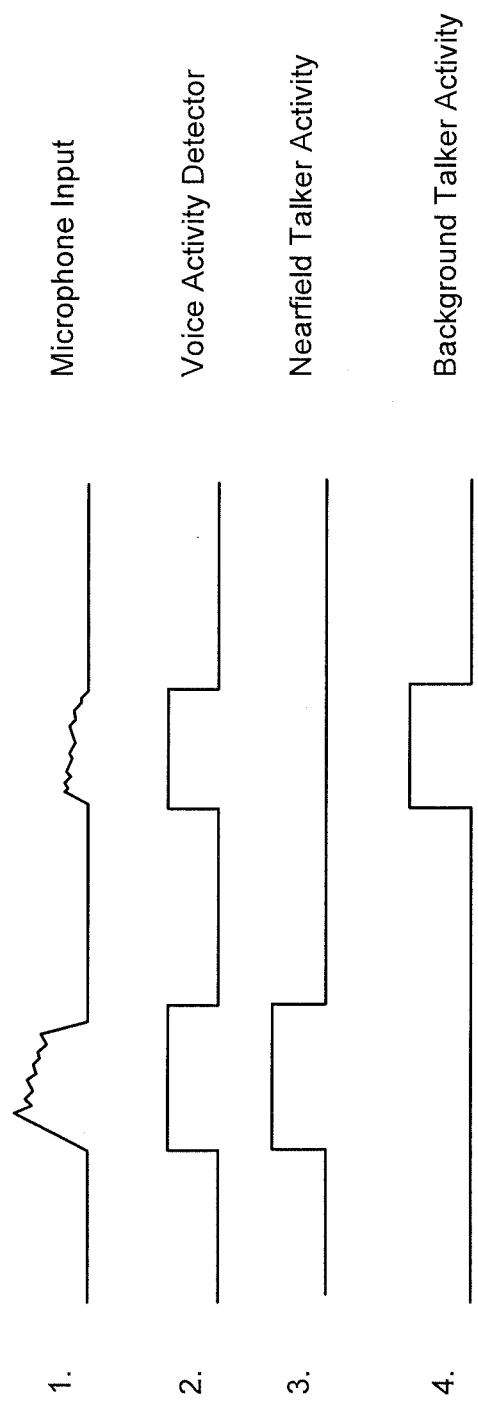
FIG. 11 illustrates exemplary signals relating to the detection of nearfield and background talker activity using voice activity detection.
Figure 12:
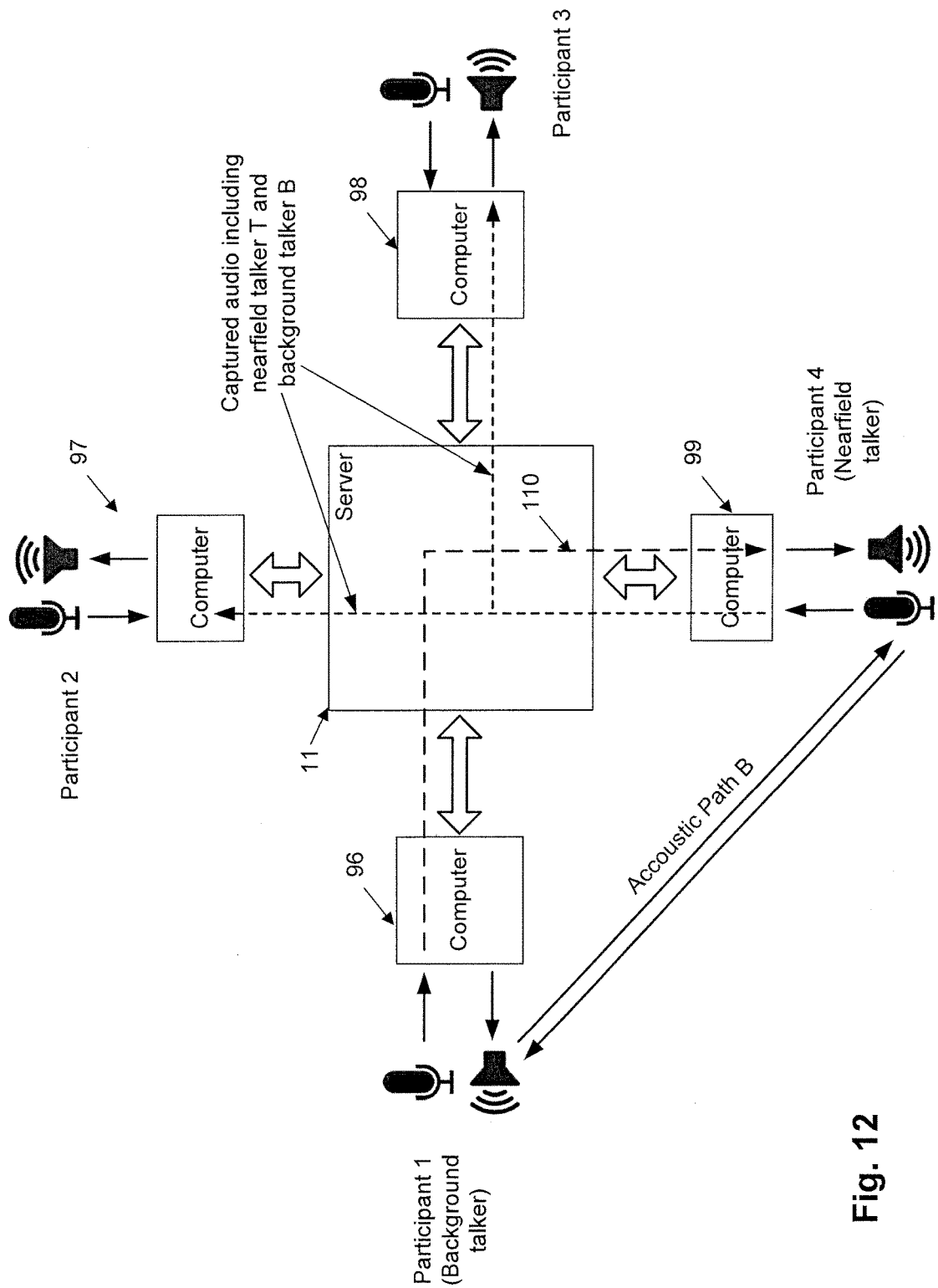
FIG. 12 illustrates schematically a scenario of four participants communicating over an audio conference system.
Figure 13:
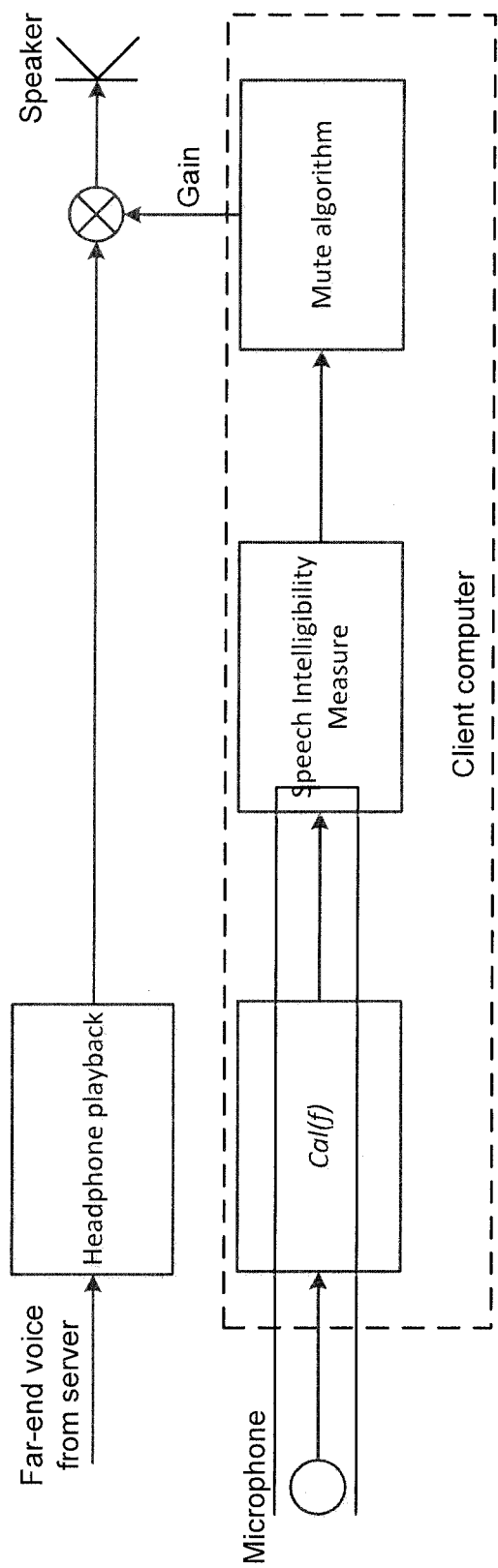
FIG. 13 illustrates an exemplary framework for implementing an automatic muting procedure in an audio conferencing environment.

Procedure 100 will be described with reference to three primary embodiments:

1) An active feedback embodiment including specific hardware for detecting crosstalk. This embodiment is illustrated in FIGS. 8 and 9.
2) A manual detection embodiment wherein selection and suppression of crosstalk is controlled by the audio conference participants through a graphical user interface (GUI). This embodiment is illustrated in FIG. 10.
3) An automatic muting embodiment wherein the central server and/or local client computers perform intelligent detection and suppression of crosstalk without active involvement by the conference participants. This embodiment is illustrated in FIGS. 11 to 13.

At step 101, the presence of nuisance audio is detected. Nuisance audio represents crosstalk audio that is deemed to interfere or potentially interfere with the audio heard by one or more conference participants in a negative manner Examples of nuisance audio are the delayed or echo copies of a participant's voice resulting from the scenarios mentioned above.

At step 102, the detected nuisance audio is associated with one or more participants of the audio conference or with one or more participant's hardware. For example, a participant may hear an echo of their voice but that echo is associated with a speaker of a nearby participant.

At step 103, a determination is made as to whether the detected nuisance audio should be suppressed. This determination is made, for example, based on whether the nuisance audio is deemed to be above a threshold level to be significantly disruptive to a particular participant.

Finally, at step 104, suppression of the nuisance audio is performed. It will be appreciated that steps 102 and 103 are interchangeable in that step 103 can be implemented before step 102.

Procedure 100 will now be described in more detail in relation to each of the three embodiments described above.

Active Feedback Embodiment

In the first embodiment, nuisance audio is detected by equipping one or more conference participants with active noise cancelling headphones to pick up audio information of the environment around a listener. As illustrated in FIG. 8, each noise cancelling headphone device 61 includes an external microphone S 62, an external microphone E 63 and an internal microphone I 64.

These microphones are utilised to pick up duplicate conversations that the user of the headphone device may be experiencing, in that they pick up talkers around the user. They can then be used to remove corresponding conferencing audio 66 which is being fed to that particular user.

The three microphone feeds are fed to a processing unit 67 which can be functionally contained within the central audio server. The utilisation of these microphones assist in capturing what the user is hearing, not necessarily what they are saying. This is provided by having microphones at the user's ears to thereby determine who can hear whom.

The echo detection can also be used to determine by the client 67 that another microphone has picked up the user's voice and sent it back to them through the conference connection.

If a user's voice is picked up by multiple microphones (e.g. their own microphone and a neighbouring user's microphone), one of the signal paths needs to be determined as the most desirable and the others need to be suppressed. Typically, the user causing the echo can be asked to mute their microphone. We can likely assume the situation reverses when the second person starts talking.

Architecture 1: A headset 61 with three microphones 62-64 (for example, as used for active noise cancellation), is reconfigured to allow dynamic detection of nuisance talkers in an acoustic environment that are also present on a conference system. The headset microphones are designated for speech (S) 62, external ear cup (E) 63, and internal ear cup (I) 64. The microphone signals are forwarded for processing to processing unit 67.

The processing unit 67 processes the audio signal in two initial stages 68, 69. A first stage 68 comprises an external noise detection to determine whether there is external noise in the acoustic environment. This is calculated by comparing the signal at S and E. If there is signal at E when S is inactive, there is likely to be noise in the acoustic environment. An indicator is output from unit 68 to indicate that that the presence of nuisance audio is detected.

The second stage 69 is to determine whether the external noise is audible or present at the ear of the listener. This is calculated by comparing the external signal E 63 and the internal signal I 64. There will be a transfer function due to the earpiece of the headset that must be compensated for. The transfer function will describe the amount of acoustic isolation provided by the noise cancelling headphones. The system may enhance or suppress the external noise when presented to the listener, depending on whether it is determined to be part of the conference audio.

The third stage 70 is to match the internal and/or external noise signal to the signals on the conference call to associate the nuisance audio with one or more participants or participants' hardware. Preferably, the signals for matching are first passed through a voice activity detector to limit the matching to regions where there is a high confidence of speech. As there is likely to be a large delay between the nuisance speech and the conference speech, a significant matching buffer should be provided for use to match against. This can be up to 3 seconds in length. If there is a match 71 between the nuisance speech and the conference speech, the offending talker is identified to a GUI 72 to alert the user.

The determination of where the nuisance audio is originating may determine how the nuisance audio is suppressed. For example, if the nuisance audio arises from the listener being able to acoustically hear the speaker, the speaker's audio may be muted at the listener's local client computer. If the nuisance audio is an echo picked up from the dual recording of audio from two proximal participants, the nuisance audio may be suppressed at the speaker's local client computer or at the central server. Alternatively, the server may actively refrain from mixing a particular user's audio input to selected output audio streams where an echo or duplicate audio is detected. In cases where the server is unaware of duplicate audio, the ability to selectively suppress the endpoint is preferably provided by muting the entire output of an audio stream in order to prevent the duplicate output audio.

Architecture 2: In a second implementation, a form of very long delay buffer is used to echo cancel the overlapping signal. In this arrangement, the talkers in the acoustic environment are matched directly to users on the conference call. The talking events are directly matched between the acoustic path and the conference path.

In this way, a determination can be made as to whether the user can actually hear the interferer. If a microphone detects the signal (for example on the external cup of a headphone) it may not be very audible at the ear (due to acoustic isolation of the headphones). There can therefore be a double check that the noise is audible to the inner microphone. The signals should be continuously monitored as circumstances can change. For example, two users can move apart from one another, or uses can be muted from conversations.

The processing can occur in a distributed or localised manner, either on local client computers or on a central server hosting the audio conference. However, it is preferably done locally on the user's client resources to reduce additional processing on the central server.

Architecture 3: An example architectural implementation is shown 80 in FIG. 9. In this arrangement, the microphone S 81 is picking up the direct speech of the user but is also picking up the echo signal of a nuisance signal. S is processed using standard signal processing modules 82, such as EQ, level and noise reduction, to produce S' 83. Signal S is also stored in a buffer, shown as "nuisance buffer" 84 that has a large analysis window $T_{window}$. The echo detection component 86 determines if the speech at S is an echo of itself with a long delay. The echo detection component acts as a long delay echo canceller. This needs to be a continuous analysis as the delay of the signal through the network to a second endpoint device can be varying. The signal to be removed is determined from S, or optionally (if available) from E or I. This is then passed to the standard signal processing module to create S'.

The signal processing described above is just an example, with many variables available. The implementation can also be in many different places. For example, within a low power active headset device, or within a connected PC or mobile phone that has a multichannel audio interface with the microphones.

Manual Detection Embodiment

A second methodology of detecting nuisance audio involves the manual detection of nuisance audio via an appropriate Graphical User Interface (GUI). An exemplary GUI 90 is illustrated in FIG. 10. In this arrangement, each participant in the audio conference is separately illustrated in GUI 90 as a graphical icon (E.g. 91), and the user is able to select a button (E.g. 92) associated with that icon to indicate if they can hear nuisance audio from one or more other participants, including their own voice. In other embodiments, the various participants may be represented as a photo or a live video feed if that is available. If a participant is detecting an echo of their own voice, they are prompted to select their own icon. By clicking on a particular participant's icon, the GUI presents dialog boxes such as boxes 93 and 94, which allow a user of the GUI to confirm whether that participant's voice can be heard as acoustic crosstalk or as an echo through the speaker/headphones.

The GUI 90 may also display which participants are currently talking in an activity panel 95. In the illustrated example, participants 2 and 5 are detected to be currently talking. The determination of who is currently talking is made by one or more of analysing the voice activity at the local input client computer or at the central server using a VAD, or through voice recognition if the participants have pre-registered their voice. This activity panel makes it easier for each participant to identify which of the other participants are contributing nuisance audio to their feed in the audio conference.

Use of the GUI also facilitates the selective suppression or deactivation of particular audio streams by participants that they can hear separately from multiple locations, which are providing a problem. After designating that a user is contributing crosstalk, the system may automatically take action to rectify the problem or may prompt the user to provide input. In the former case, the system may automatically suppress the nuisance audio streams by, for example, the server not sending or mixing the nuisance input audio stream into an output audio stream, an input client computer suppressing the input device causing the nuisance audio or an output client computer suppressing (selective muting) the combined stream from the server prior to playout. In the latter case, the user may be prompted to confirm if they would like the conference audio for the particular participant contributing crosstalk to be muted. This would be advantageous in situations where the participant is physically located close to the user and can be heard acoustically.

Details on automatic suppression of the crosstalk are described in more detail below.

This manual detection and deactivation approach is suitable where there is a certain probability or likelihood of false alarm of duplicate audio detection, and an automatic corrective action would have an intolerable impact in the case of such false alarm. In particular, this embodiment avoids the situation where a participant and associated voice activity are removed from a user's output conference mix which they are unable to hear from any local acoustic path. By displaying an indication of the presence of duplicate audio to the GUI, and allowing the user to confirm a suggested action to correct this, the user being in the loop provides a means to substantially reduce any false alarm and undesirable impact.

Automatic Muting Embodiment

A third solution for detecting nuisance audio to analyse the received audio signals is to distinguish between a nearfield talker's voice (T), background talker's voice (B) and background noise (N). This third solution relies on the server or local client computers determining a correlation of voice activity based on some apriori information such information obtained from knowledge of the headphone model used by a target participant. Unlike the first embodiment, which requires additional sensors and intelligence in the hardware, the third embodiment is performed entirely by processors within the central server and/or local client computers. This allows crosstalk to be suppressed or muted for participants using a wider range of conventional audio input and output devices, including speaker phones. This embodiment focuses particularly on the automatic muting of specific streams of connection in the audio conference which can have more impact on cases of simultaneous speech activity occurring across the participants that are within acoustic proximity As shown in FIG. 2, audio data is passed from one participant to another through the local client computers (E.g. 6) and a central server 11 which is responsible for hosting the audio conference. Each participant has a microphone for receiving input audio and a speaker for outputting audio. The central server may be accessible through the internet or locally through a local area network. Thus, the central server and local client computers provide processing points for controlling the audio from each participant to reduce crosstalk. To reduce server load, in some embodiments it is preferable for the local client computers to perform crosstalk detection and suppression procedures. However, in some embodiments, rather than send the actual audio signal over a local network, the system is able to send voice activity, such as the onset and offset of talking events, for the purposes of crosstalk detection. In these latter embodiments, the server can be utilised without significant drain on system performance The various input audio signals from each participant microphone are passed through their respective local client computers and also through server 11. Based on certain characteristics or input, the audio signals can be classified as one of the above distinct audio types T, B or N. FIG. 11 illustrates exemplary signals describing the detection of nearfield and background talker activity using voice activity detection (VAD). Background signals B represent nuisance audio that could be suppressed or muted.

FIG. 12 illustrates schematically a scenario of four participants communicating over an audio conference system using respective computer terminals 96-99. Participant 4 is currently speaking and represents a nearfield talker. Participant 1 is located proximal to participant 4 and, at the illustrated time, audio output from participant 1's speaker travels along acoustic path B directly to participant 4 and participant 4's microphone. Thus, participant 4 hears an echo of their voice and a delayed version of participant 4's voice is recorded through propagation along acoustic path B to participant 4's microphone. This undesired delayed audio signal is communicated to other participants in the audio conference. Procedure 100 of FIG. 7 will be described with reference to the scenario illustrated in FIG. 12. However, it will be appreciated that procedure 100 is applicable to a number of other scenarios in which undesired audio signals arise.

Figure 7:
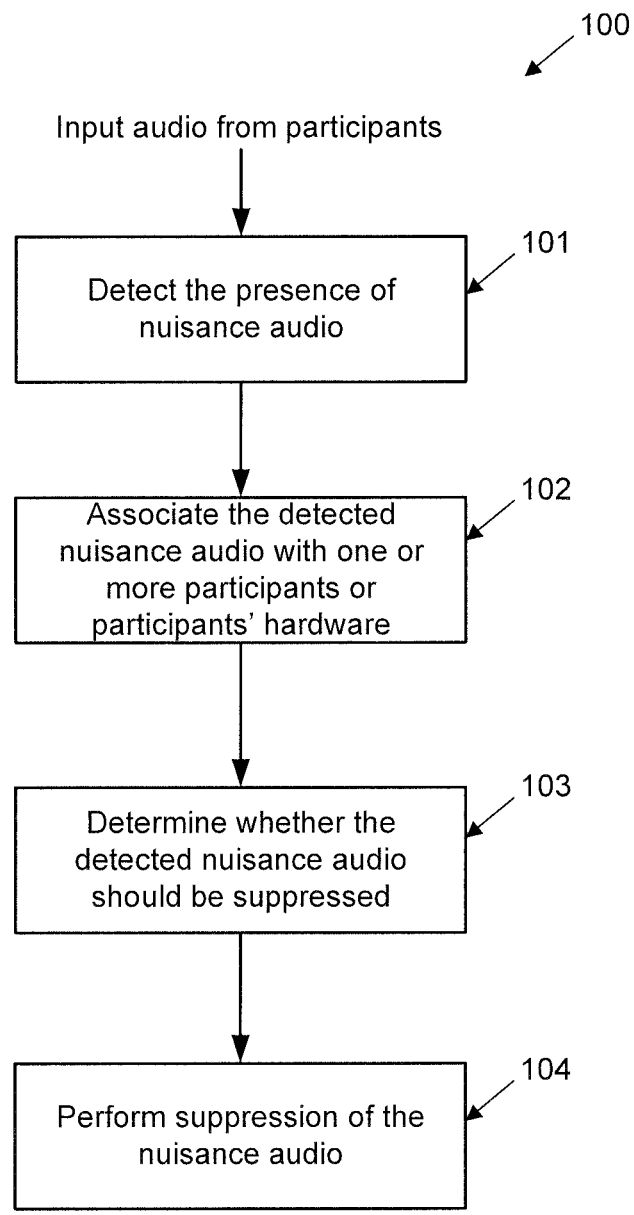
FIG. 7 illustrates a process flow diagram of the primary steps in a method of reducing crosstalk in an audio conference environment.

Referring to step 101 of FIG. 7, detecting the background talker activity B begins by taking the microphone input and applying a VAD algorithm to distinguish between voice and background noise. In the scenario of FIG. 12, this algorithm would be performed by the computer of participant 4 or by the server. VAD algorithms act to detect the presence or absence of human speech based on predefined classification rules. Next, the voice activity is segmented into nearfield talker and background talker activity signals as in FIG. 11. In one embodiment, the segmentation of nearfield talker and background talker signals can be accomplished by aggregating the level statistics of each talker over time. The nearfield talker will have higher levels than the background talker each with a given distribution of levels. A classifier can then determine instantaneously the probability of the object being the nearfield talker T or the background talker B. Alternatively, multiple VAD algorithms can be designed so one is configured to pick up nearfield speech, while another is designed to pick up background speech.

Once a background talker has been detected at the input, the task is then to identify the corresponding participant in the conference, as per step 102 in FIG. 7. In one embodiment, this can be achieved through computationally expensive mechanisms such as long term correlation. However, this gives rise to additional complications in accounting for acoustic transfer functions from the background talker to the microphone. A simpler, yet robust embodiment is to look at the contribution of the background talker activity in relation to the VAD signal of other participants in the conference and apply Conversational Probability (CP).

CP is a measure of the likelihood that a particular voice signal matches the statistical norm of the voice activity of conversations. A typical conversation assumes that for the majority of the time, one person is talking at a time. There are brief moments of overlap, but for the most part, participants take turns in contributing to the conversation. Based on this assumption, a conversational probability metric is formed that is based on the percentage of talker overlap relative to all talker activity in a conference. For every time instant where a particular talker b talks when another person is talking, a counter c is decremented. Every time talker b talks and no one else is talking, c is incremented. The conversational probability is therefore given by:

$$CP(b) = \frac{c}{C}$$

where the Conversational Probability of talker b, CP(b), is given by the counter c of non overlapped time instances, and C is the total number of sampled time instants.

If a signal of a background talker B frequently overlaps with a given participant X, it is reasonable to assume that B corresponds to participant X. This will manifest as a low but not insignificant CP and a threshold may be applied to associate B with participant X. In the scenario illustrated in FIG. 12, the background talker B is participant 1.

A further way in which the origin of the nuisance audio can be identified is through voice recognition. If each of the participants in the audio conference have their voice registered using voice recognition software, performing voice recognition on the nuisance audio may be able to detect the user causing the crosstalk.

Additional participant audio association can be made by further input such as GPS locations of the participants, manual indication by participants (such as through a user interface as described above), office plans or layouts, logging IP addresses or MAC addresses of the originating computer devices. The server may store this data so that if a similar conference configuration happens again that was flagged as causing an acoustic problem, the server issues controls to promptly address the issues and optionally alert the conference participants.

In the case where echo loops are set up in the audio conference system, echo detection and suppression techniques may be implemented to identify the participant responsible for the nuisance audio. For example, in the scenario illustrated in FIG. 12, an echo loop is set up along path 110 between participants 1 and 4 as participant 4's microphone records direct speech from participant 4 and an echo of the speech transmitted from participant 1's speaker along acoustic path B. Thus, computer 99 is able to detect a delayed version of the same speech and take corrective action to suppress the detected echo signal.

Next, at step 103, a decision is made as to whether the nuisance audio should be muted. Although the association between talking participant 4 and background participant 1 may be established, a decision to mute participant 4 through the output render for a listener is dependent on whether the listener is able to hear the acoustic path B. In some instances, the output audio render may be performed through closed headphones worn by participant 4, in which case the audio signal of the background participant 1 through their microphone should not be muted. However in the case where B can be distinctly heard (e.g. through open headphones or speakers), there is the option of muting the microphone of participant 1 through the listeners' output device. This decision can be made at server X or at the local client computer.

To determine if the listener can hear the acoustic path B, details of the output render device of the nearby participant (closed headphones, speaker phone etc.) should be known. By way of example, if the nearby participant is known to be using closed headphones, a decision not to mute the nuisance audio may be made. If, however, the nearby participant is known to be using a speakerphone, a decision to mute the audio may be made in favour of the listener simply hearing the nearby participant acoustically. The required hardware information is obtained, in one embodiment, by requesting that each user specify their input and output hardware through an interface at the commencement of the audio conference. In another embodiment, the information is extracted automatically from the local client computer through relevant plug-and-play software and system specifications.

Another factor is the level of the background talker B relative to the nearfield talker T. This decision is typically based on a predetermined threshold of audibility. If B is below a the threshold level, it would be safe to assume the inaudibility of B at the listener, and a decision is made not to mute participant X. If B is above the threshold, then muting participant X is performed.

Thus the decision to mute acoustically proximate participants to a given listener is determined by the likelihood of the listener being able to hear B and whether the voice is intelligible enough. This can be estimated through knowledge of the output render device as well as the signal level coming in through the microphone capture.

To predict the voice level of background talker B at the ear drum of nearfield talker T from T's microphone input, it is necessary to consider the acoustic path from the mouth of B to the ear drum of T, which includes the path from the mouth of B to T's ear entrance, whose magnitude frequency response is denoted as D(f), and the path from ear entrance to ear drum, which is essentially a transmission loss of headset with the magnitude frequency response denoted as L(f). Consideration is also required of the acoustic path from the mouth of B to T's microphone, whose magnitude frequency response is denoted as H(f), and the magnitude response of microphone M(f) including sensitivity.

To infer the amount of voice of B leaking into the ear drum of T from the T's microphone input, it is necessary to derive a transfer function with magnitude frequency response Cal(f), that satisfies the following equation, $$H(f)M(f)Cal(f) = D(f)L(f) \quad (1)$$

therefore, $$Cal(f) = \frac{D(f)L(f)}{M(f)H(f)} \quad (2)$$

Equations (1) and (2) also apply when predicting the level of background noise N at the ear drum of talker T from T's microphone input. The difference between these two scenarios (voice at the ear drum and noise at the ear drum) is the magnitude responses of D(f) and H(f).

For the estimation of ambient noise N, D(f) and H(f) can be well approximated and predetermined by measurements in the diffuse field. A simple way to measure them is to drive multiple speakers with uncorrelated pink noise and measure D(f) and H(f) on a standard HATS (head and torso simulator) in that particular sound field, In addition, at low and mid frequencies, D(f) and H(f) should be very close as the distance between microphone and ear entrance is small compared with the distance between B and T for typical headset and in typical conference settings. So for that frequency range, $$Cal(f) \approx L(f)/M(f) \quad (3)$$

For the estimation of voice, it is assumed that B and T are not so close that proximity or near-field effects should be considered. In that case, D(f) and H(f) are only dependent on direction of arrival of voice of B. D(f) and H(f) can be measured for typical directions of arrival using, for example, a HATS on a rotating table. After this initial step a few options are available:

The measured magnitude responses D(f), H(f) (or D(f)/H(f)) of typical arrival directions and load corresponding responses can be stored as claimed in direction of arrival to calculate the Cal(f) and further the leaked voice level (if it can be determined).

The measured magnitude responses D(f), H(f) (or D(f)/H(f)) of typical arrival directions can be stored and an estimation made of the estimated voice level leaking into the ear drum for each direction of arrival (if it is not possible to determine the arrival direction).

One set of these magnitude responses representing responses from most-likely direction of arrival, or (weighted) average responses can be saved and the estimated voice level leaking into the ear drum calculated accordingly.

To determine Cal(f) in equation (2), it is necessary to also know M(f) and L(f). If the specific headphone/headset model the user is using can be determined through USB, Bluetooth, or user input, M(f) and L(f) can be measured and predetermined. However, this is not always feasible in practice and sometimes the user does not know the model name to provide the correct input.

Data from measurements of different types of commercial headphones show that the general shape of Cal(f) defined in equation (2) can be clustered into a few categories: over-the-ear headphone, ear buds and ear inserts. Therefore, an alternative solution is to provide the average Cal(f) for each cluster and leave up one broadband sensitivity parameter S for the user to tune.

There are many ways to tune the broadband sensitivity. One simple approach is to wear the headset/headphone, playback a stimuli, e.g., a narrow-band noise at 1 kHz from the speaker on mobile, turn up or down the volume until the audio can just be discerned. This discernible level represents a sound pressure level of about 2 dB so the broadband sensitivity can be adjusted accordingly. This procedure can be performed at one single frequency for a few times or at multiple frequencies to achieve a more reliable sensitivity adjustment.

After determining the noise and voice of background participant 1 leaking into the ear drum of near-field participant 4, the speech intelligibility can be evaluated using an index such as the Speech Intelligibility Index (SII) to predict how intelligible background participant 1 is to nearfield participant 4, and selectively mute the signal from headphone/headset as claimed in a specific muting algorithm. The muting algorithm may be a simple rule such as "mute the headphone/headset when the speech intelligibility is above a predetermined threshold".

In the case where values of D(f) and H(f) from multiple directions are stored but the true incident angle is unknown, a set of speech intelligibility scores can be obtained corresponding to these directions. The lowest scored can be chosen to compare against the threshold to make sure of intelligibility or the distribution of speech intelligibility can be viewed to find the best strategy accordingly.

An exemplary implementation of the above automatic muting embodiment is illustrated schematically in FIG. 13.

Finally, at step 104 of procedure 100, suppression of the nuisance audio is performed. The actual suppression (or muting) of detected nuisance audio (including duplicate or echo audio signals), can be performed in one of the following ways:

1. At the central server by not sending or mixing an audio input that is detected to include nuisance audio.
2. At the output client computer by muting the specific audio stream that is detected to include nuisance audio.
3. At the output client computer by using a buffer and adaptive process to suppress the duplicate audio content.
4. At the input client computer by muting the input device that is detected to produce nuisance audio.

The above automatic muting embodiment is able to correct for instances when a conference participant who is using a mobile input/output device (such as a smartphone) enters a conference room where there is a speaker phone and intends to subsequently participate using the speaker phone. During the period when the participant's mobile device is still active, duplicate audio may be sent through the mobile device input and the speaker phone input. This duplicate audio can be detected and corrected for by selectively muting the input microphone of the mobile device.

In the case of extreme loop or 'howl' the feedback audio may become fairly tonal. The embodiments described herein are able to deal with this situation by detecting the echo path and automatically muting the path before such a time as the feedback becomes catastrophic. However, it is also noted that the case of a howl loop being formed can be detected by a special case, in that at least two endpoint microphones will be continuously active and sending quite large and repetitive signal. In such a situation, the system may remove one of the microphones from the system quickly even without manual input or confirmation. In such a case, one embodiment includes muting the microphone which had been least active prior to that point, or which had just unmuted, or alternatively which had previously had the lower local echo path. These indicators reduce the probability of muting a microphone corresponding to the main participant or a room installed system which is likely to be the more desired audio to be captured.

In a further refinement on the above implementations, advantage can be taken of prior histories to detect that similar conditions are likely to lead to similar problems. For example, logs of the IP address, MAC device addresses, GPS coordinates etc, of all the users can be taken. If a similar configuration happens again that was flagged as causing an acoustic problem, a user alert can be issued to tell the user and provide the relevant mapping/muting in the server as used previously. In a further alternative, a user interface can be provided to roster everyone that is expected to be acoustically close to a user and provide a button interface that allows the user to "mute everyone close to me". This mutes all their conference streams close to a user's endpoint so they can listen to their acoustic path instead.

A number of further refinements are possible. For example, instead of dealing with actual audio signals, systems can be constructed to utilise talk activity, including the onset and offset of talking activity and a parameterised representation of the talk activity. The parameterised structure can then be matched to determine if the same conversation is being picked up at multiple locations. This can lead to reduced computation requirements.

The parameterised representation can be used in both longer term fault detection (look for onset correlations) and then immediate suppression (increasing the threshold of talk activity whenever some-one else on the local network who has been identified as being in ear shot is active).

The parameterisation of voice activity allows for the creation of a hash of the frequencies in spectral peaks. These can be utilised to look up a cache of recent voice peaks to check if there are multiple hits to see if the peaks have the right timing information. If there are matches then, it is known, with a reasonable certainty, that a duplicate is present. By utilising a cache with a fairly short history (say twice the longest possible delay), covering current connections, the computational expense is kept low. Once the detection of multiple echoes is present, the ancillary echoes can be removed or cleaned up by echo cancelling, or by muting the offending signal paths.

Depending on requirements, the embodiments can be run on a local client computer or on a central server. One approach that supports this expected value assessment is for a local client resource or additional hardware that monitors or is additionally sent audio information from each active endpoint. Ideally, this can be carried out by clients with high central bandwidth and spare processing resources.

In terms of detecting the nearby problem, a failure mode arises when one person's capture performs an AGC to track into the adjacent speaker. This can be observed by tracking the activity of the AGC at different clients as the conference progresses. This information can be utilized in the detection and disambiguation of who can hear who. The arrangement has the advantage of proposing methods that permit more selective removal of signals without resorting to full muting of the microphone.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of reducing the effects of cross talk pickup of at least a first audio conversation by multiple audio input devices provided in an audio conferencing environment, the audio conferencing environment including multiple users participating by means of a series of associated audio input devices for the provision of audio input, and a series of audio output devices for the output of audio output streams to the multiple users, with the audio input and output devices being interconnected to a mixing control server for the control and mixing of the audio inputs from each audio input devices to present a series of audio streams to the audio output devices, the method including the steps of:
   (a) monitoring the series of audio input devices for the presence of a duplicate audio conversation input from at least two input audio sources in an audio output stream, the monitoring comprises, in the audio input from at least one of the at least two input audio sources, distinguishing background audio indicative of one or more background users from nearfield audio of a nearfield user; wherein the background audio is distinguished from the nearfield audio by determining a correlation of voice activity based on predetermined information and
   (b) where a duplicate audio conversation input is detected, determining whether to suppress the presence of the duplicate audio conversation input in the audio output stream.

2. A method as claimed in claim 1 including the step of:
   (c) suppressing the presence of the duplicate audio conversation input in the audio output stream.

3. A method as claimed in claim 1 wherein said associated audio input devices include an active noise cancelling set of headphones including an internal ear microphone.

4. A method as claimed in claim 3 wherein said active noise cancelling set of headphones include an internal ear microphone, a microphone external to the headphones and a voice microphone.

5. A method as claimed in claim 1 wherein audio from a current user's input audio stream is analyzed to determine if a voice is present, and when the voice is present, the audio output stream is analyzed to determine if a corresponding conversation is present, and if present, a notification of presence is flagged.

6. A method as claimed in claim 2 wherein said step (a) further includes utilizing a delay buffer for comparing a current audio input stream to determine if any of the audio output streams include the same audio content as the audio input stream and step (c) includes suppressing the echo if the audio output streams are determined to include the same audio content as the audio input stream.

7. A method as claimed in claim 1 wherein step (b) includes:
   (b)(i) associating the detected duplicate audio conversation with one or more users or users' hardware.

8. A method as claimed in claim 7 wherein step (b)(i) includes:
   determining a voice activity measure of the duplicate audio conversation;
   determining a voice activity measure of each user;
   correlating the voice activity measure of the duplicate audio conversation with the voice activity measures of each user; and
   selecting the user with the highest correlation.

9. A method as claimed in claim 8 wherein the step of correlating the voice activity measures includes deriving a conversational probability indicative of the likelihood that the duplicate audio conversation matches an audio signal captured by a particular user's output device.

10. A method as claimed in claim 7 wherein step (b)(i) includes performing voice recognition on the duplicate audio conversation and comparing this with stored voice information for users of the audio conference.

11. A method as claimed in claim 7 wherein step (b) includes:
    (b)(ii) determining a likelihood of whether the user is able to directly hear an acoustic version of the duplicate audio conversation from another user's mouth or another user's output device.

12. A method as claimed in claim 11 wherein the likelihood is dependent upon an amplitude of the background audio relative to the amplitude of the nearfield audio.

13. A method as claimed in claim 12 wherein the likelihood is based on a determination of whether the amplitude of the background audio is greater than a predetermined threshold of audibility.

14. A method as claimed in claim 2 wherein step (c) includes selectively muting the duplicate audio conversation at one or more of the user's output devices.

15. A method as claimed in claim 2 wherein step (c) includes selectively deactivating the input device of a user for a predetermined time period.

16. A method as claimed in claim 2 wherein step (c) includes instructing the server not to mix the audio input from an audio input device for a predetermined time period.

17. A method as claimed in claim 1, wherein step (b) includes:

(b)(iii) measuring the intelligibility of the speech in the duplicate audio conversation.

18. An audio conferencing system for conducting a multi user audio conferencing, including:
- a series of audio input devices for capturing audio input streams of conference users;
- a series of audio output devices for outputting corresponding mixed audio output streams for said conference users;
- a mixing server interconnected to said audio input streams, and for each audio output stream, mixing predetermined ones of said audio input streams together to produce a corresponding audio output stream of other conference users, for forwarding for output to a corresponding audio output device;
- at least one monitoring unit for monitoring if more than one audio input stream has picked up a duplicate audio conversation of a conference user, wherein the monitoring comprises, in at least one of the audio input streams, distinguishing background audio indicative of one or more background users from nearfield audio of a nearfield user, and where such a duplicate conversation has been picked up, determining whether to suppress the duplicate audio conversation for at least one of the audio output streams.

19. An audio conferencing system as claimed in claim 18, wherein said monitoring unit includes a delay buffer for maintaining a delayed buffer copy of a current input audio stream and monitoring the audio output stream for copies of the audio input stream.

20. An audio conferencing system as claimed in claim 19 wherein the monitoring unit further includes a suppression unit for suppressing detected copies of the audio input stream that are present in the audio output stream.

21. An audio conferencing system as claimed in claim 19 wherein an audio input device, at least one monitoring unit and an audio output device are collocated as a local client computational resource, and said mixing server is separately located as a server computational resource, interconnected to said local computational resource.

* * * * *